US011875470B2

(12) United States Patent
Little et al.

(10) Patent No.: US 11,875,470 B2
(45) Date of Patent: Jan. 16, 2024

(54) ADJUSTABLE VIRTUAL SCENARIO-BASED TRAINING ENVIRONMENT

(71) Applicant: State Farm Mutual Automobile Insurance Company, Bloomington, IL (US)

(72) Inventors: Rebecca A. Little, Mesa, AZ (US); Deanna L. Stockweather, Normal, IL (US); Nathan C. Summers, Mesa, AZ (US); Bryan R. Nussbaum, Bloomington, IL (US); Karen Wylie, Buckeye, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/077,063

(22) Filed: Dec. 7, 2022

(65) Prior Publication Data
US 2023/0105545 A1 Apr. 6, 2023

Related U.S. Application Data

(63) Continuation of application No. 17/395,412, filed on Aug. 5, 2021, now Pat. No. 11,551,431, which is a (Continued)

(51) Int. Cl.
*G06T 9/20* (2006.01)
*G06T 19/20* (2011.01)
(Continued)

(52) U.S. Cl.
CPC ............ *G06T 19/20* (2013.01); *G06T 19/003* (2013.01); *G06Q 40/08* (2013.01); *G06T 2200/04* (2013.01)

(58) Field of Classification Search
CPC .......... G09B 19/00; G09B 5/02; G06T 19/20; G06T 19/003; G06T 2200/04;
(Continued)

(56) References Cited

U.S. PATENT DOCUMENTS 6,836,270 B2 12/2004 Du
7,949,295 B2 5/2011 Kumar et al.
(Continued)

FOREIGN PATENT DOCUMENTS

EP 0930755 7/1999
JP 4189996 12/2008
(Continued)

OTHER PUBLICATIONS

"360 Degree Virtual Reality Inspector Training", retrieved at least as early as Aug. 28, 2018 at <<https://www.nachi.org/360.htm>>, InterNACHI, International Association of Certified Home Inspectors, 2018, 10 pages.
(Continued)

*Primary Examiner* — Xilin Guo
(74) *Attorney, Agent, or Firm* — Lee & Hayes, P.C.

(57) ABSTRACT

A virtual environment may be generated, the environment including a procedurally generated virtual property. The virtual property may include various features automatically generated based upon a procedural rule set, so as to provide variability between two or more virtual properties. One or more procedurally generated virtual properties may be provided to a user, and various virtual tools may be provided via which the user may identify relevant aspects corresponding to risk associated with the virtual property.

20 Claims, 6 Drawing Sheets

Related U.S. Application Data continuation of application No. 16/374,107, filed on Apr. 3, 2019, now Pat. No. 11,107,292.

(51) Int. Cl.
  *G06T 19/00* (2011.01)
  *G06Q 40/08* (2012.01)

(58) Field of Classification Search
  CPC ..... G06T 2200/24; G06T 11/60; G06T 19/00; G06T 2219/004; G06T 2219/024; G06Q 40/08; G06F 3/011; G06F 3/017
  See application file for complete search history.

(56) References Cited

U.S. PATENT DOCUMENTS

| | | | |
|---|---|---|---|
| 8,294,557 B1* | 10/2012 | El Saddik | G06F 3/016 340/407.1 |
| 8,655,683 B2 | 2/2014 | Grundel et al. | |
| 8,694,501 B1 | 4/2014 | Trandal et al. | |
| 8,718,612 B2 | 5/2014 | Calman et al. | |
| 8,761,811 B2 | 6/2014 | Alonzo | |
| 9,824,397 B1 | 11/2017 | Patel | |
| 10,262,375 B1 | 4/2019 | Howard | |
| 10,521,865 B1 | 12/2019 | Spader | |
| 10,521,962 B1 | 12/2019 | Nussbaum et al. | |
| 10,579,749 B1 | 3/2020 | Davis et al. | |
| 10,832,476 B1 | 11/2020 | Nussbaum | |
| 10,977,735 B1 | 4/2021 | Cardona et al. | |
| 11,024,099 B1 | 6/2021 | Little | |
| 11,481,081 B2 | 10/2022 | Deng et al. | |
| 11,556,995 B1 | 1/2023 | Little et al. | |
| 11,704,731 B2 | 7/2023 | Summerson et al. | |
| 2002/0196202 A1 | 12/2002 | Bastian et al. | |
| 2012/0047082 A1 | 2/2012 | Bodrozic | |
| 2012/0095783 A1 | 4/2012 | Buentello et al. | |
| 2012/0210254 A1* | 8/2012 | Fukuchi | G06F 3/012 715/757 |
| 2013/0290033 A1 | 10/2013 | Reeser et al. | |
| 2014/0180725 A1 | 6/2014 | Ton-That et al. | |
| 2014/0280269 A1 | 9/2014 | Schultz et al. | |
| 2014/0280644 A1 | 9/2014 | Cronin | |
| 2015/0020003 A1 | 1/2015 | Karam | |
| 2015/0056582 A1 | 2/2015 | Selvaraj | |
| 2015/0206218 A1 | 7/2015 | Banerjee et al. | |
| 2016/0077547 A1 | 3/2016 | Aimone et al. | |
| 2016/0117646 A1 | 4/2016 | Lerick et al. | |
| 2016/0148285 A1 | 5/2016 | Kalata | |
| 2017/0032466 A1* | 2/2017 | Feldman | G06Q 50/16 |
| 2017/0076408 A1 | 3/2017 | D'Souza et al. | |
| 2017/0108922 A1 | 4/2017 | Terahata | |
| 2017/0124396 A1 | 5/2017 | Todeschini et al. | |
| 2017/0206798 A1 | 7/2017 | Newman | |
| 2018/0082414 A1 | 3/2018 | Rozenberg | |
| 2018/0374276 A1* | 12/2018 | Powers | G06T 17/205 |
| 2019/0130648 A1* | 5/2019 | Duca | G06T 19/006 |
| 2021/0366206 A1 | 11/2021 | Little et al. | |

FOREIGN PATENT DOCUMENTS

| | | |
|---|---|---|
| WO | WO2016040376 | 3/2016 |
| WO | WO2016148753 | 9/2016 |

OTHER PUBLICATIONS

Badger, Transforming Enterprise Processes through Virtual Worlds, Forterra Systems Inc. (Year: 2008), 20 pages.

Bell, The Investigation and Application of Virtual Reality as an Educational Tool, American Society for Engineering Education 1995 Annual Conference, 1995 (Year: 1995), 11 pages.

Breading, M., "Virtual Reality in Insurance: Slow Down, You Move Too Fast", retrieved at least as early as Aug. 28, 2018 at <<https://strategymeetsaction.com/news-and-events-2/sma-blog/virtual-reality-in-insurance-slow-down-you-move-too-fast/>>, SMA, Strategy Meets Action, Aug. 2016, 2 pages.

"How Farmers Insurance Is Using Virtual Reality to Train Employees", retrieved at least as early as Aug. 28, 2018 at <<https://www.findcourses.com/prof-dev/I-d-articles/vr-training-farmers-insurance-13436>>, updated Jul. 2019, 8 pages.

Final Office Action dated Sep. 21, 2020 for U.S. Appl. No. 16/374,107, "Adjustable Virtual Scenario-Based Training Environment", Little, 35 pages.

Office Action dated Jan. 19, 2021 for U.S. Appl. No. 16/374,107, "Adjustable Virtual Scenario-Based Training Environment", Little, 40 pages.

Office Action for U.S. Appl. No. 16/399,005, dated Oct. 24, 2022, Little, "Virtual Multi-Property Training Environment", 13 pages.

Office Action for U.S. Appl. No. 16/399,005, dated Apr. 13, 2022, Stockweather, "Virtual Multi-Property Training Environment", 11 pages.

Non Final Office Action dated May 1, 2020 for U.S. Appl. No. 16/374,107 "Adjustable Virtual Scenario-Based Training Environment" Little, 28 pages.

Vanian, J., "Farmers Insurance Is Using the Oculus Rift to Train Workers in Virtual Reality", retrieved as early as Aug. 28, 2018 at <<http://fortune.com/2017/10/25/oculus-rift-headsets-farmers-insurance:>>, Fortune., Oct. 2017, 3 pages.

* cited by examiner

ADJUSTABLE VIRTUAL SCENARIO-BASED TRAINING ENVIRONMENT

CROSS-REFERENCE TO RELATED APPLICATION

The present application is a continuation of, and claims priority to, U.S. application Ser. No. 17/395,412, filed on Aug. 5, 2021, which is a continuation of U.S. application Ser. No. 16/374,107, filed Apr. 3, 2019, now known as U.S. Pat. No. 11,107,292, issued on Aug. 31, 2021. The entire disclosures of the application noted above is hereby expressly incorporated herein by reference.

FIELD

The present disclosure generally relates to computer-generated virtual reality (VR) environments, and more particularly, the present disclosure describes an adjustable virtual environment comprising variable features generated via procedural generation techniques.

BACKGROUND

Conventionally, real property owned, leased, or otherwise used by a business or individual may be eligible to be insured based upon risk factors associated with the property. When evaluating a real property (e.g., a commercial building such as a bakery, coffee shop, or medical office), a property specialist or other subject matter expert may be physically dispatched to the real property to assess the real property, including the structure and contents thereof, to identify the risk factors (or lack thereof) associated with the real property.

Expertise in property assessment requires a significant degree of experience. That is, a prospective property assessment specialist ("trainee") must be trained to identify relevant aspects of a real property or structure that may affect risk associated with the real property. Conventionally, an expert trainer and the trainee may physically travel to a real property or other physical site to provide property assessment training to the trainee. Travel is typically necessary in these situations because telephony and fixed-point digital image analysis (e.g., video conferences) do not allow individuals to move about the real property to dynamically and closely examine the features thereof. These time-consuming and costly travel practices, while often necessary to actually generate an insurance policy for the real property, would ideally be avoidable in the process of training a prospective property specialist. Furthermore, any one particular real property to which a trainee might expose the trainee to only the set of conditions or features present at the one real property, in which the trainee may only encounter a very small subset of aspects that are relevant in determining risk for other properties.

Existing VR systems do not entirely overcome the difficulties of property assessment training as described above. For example, virtual environments are time-consuming to develop, and any one particular virtual environment might still only provide a small subset of aspects of a property that might be relevant in determining risk. Thus, the trainee may require exposure to a large number of virtual environments to achieve a full virtual training experience. Furthermore, conventional techniques would require that a virtual environment is created manually, and as such, creating any one virtual environment may require significant time and expertise, amounting to costs comparable to the aforementioned conventional training methods.

SUMMARY

The present application discloses methods, systems, and computer-readable media via which adjustable virtual training environments may be generated and provided. Particularly, a virtual environment may include a "virtual property" generated dynamically via procedural generation techniques to include a variety of features that may be found in real properties (e.g., structures, fixture, furniture, small loose items, etc.). By procedurally generating virtual properties, the virtual environment may be adjusted to include differing aspects of diverse virtual properties generated via these techniques. The disclosed embodiments improve existing VR systems by automatically providing various embodiments of a virtual environment, comprising dynamic, adjustable arrangements of objects that make the virtual environment suitable for use in property assessment training, thereby overcoming drawbacks of conventional virtual property assessment training techniques. Various aspects are summarized below and described in further detail herein.

In an embodiment, a computer-implemented method may be provided for providing an adjustable virtual environment. The computer-implemented method may include (1) generating, via one or more processors, a virtual property comprising a plurality of features, wherein generating the virtual property comprises automatically generating at least a portion of a plurality of features in accordance with a predefined rule set, and wherein the generated virtual property is associated with one or more relevant aspects of the virtual property, each of the one or more relevant aspects affecting risk associated with the virtual property, and/or (2) providing, via the one or more processors, to a virtual environment interface device of a user, the virtual environment comprising the generated virtual property. The computer-implemented method may include additional, fewer, and/or alternate actions, including actions described herein.

In another embodiment, a computing system may be configured to provide an adjustable virtual environment. The computing system may include (1) one or more processors, and (2) one or more non-transitory computer memories storing non-transitory computer-executable instructions that, when executed via the one or more processors, cause the computing system to (i) generate a virtual property comprising a plurality of features, wherein generating the virtual property comprises automatically generating at least a portion of a plurality of features in accordance with a predefined rule set, and wherein the generated virtual property is associated with one or more relevant aspects of the virtual property, each of the one or more relevant aspects affecting risk associated with the virtual property, and (ii) provide, to a virtual environment interface device of a user, the virtual environment comprising the generated virtual property. The computing system may include additional, fewer, and/or alternate computing components and/or actions, including those described herein.

In yet another embodiment, one or more non-transitory computer-readable media may store non-transitory computer-executable instructions that, when executed via one or more processors, cause one or more computers to (1) generate a virtual property comprising a plurality of features, wherein generating the virtual property comprises automatically generating at least a portion of a plurality of features in accordance with a predefined rule set, and wherein the generated virtual property is associated with one or more relevant aspects of the virtual property, each of the one or more relevant aspects affecting risk associated with the virtual property; and (2) provide, to a virtual environment interface device of a user, the virtual environment comprising the generated virtual property. The one or more non-transitory computer-readable media may store additional, fewer, and/or alternate non-transitory computer-executable instructions, including those described herein.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which identical or functionally similar elements are depicted with like reference numerals.

DETAILED DESCRIPTION

Figure 1:
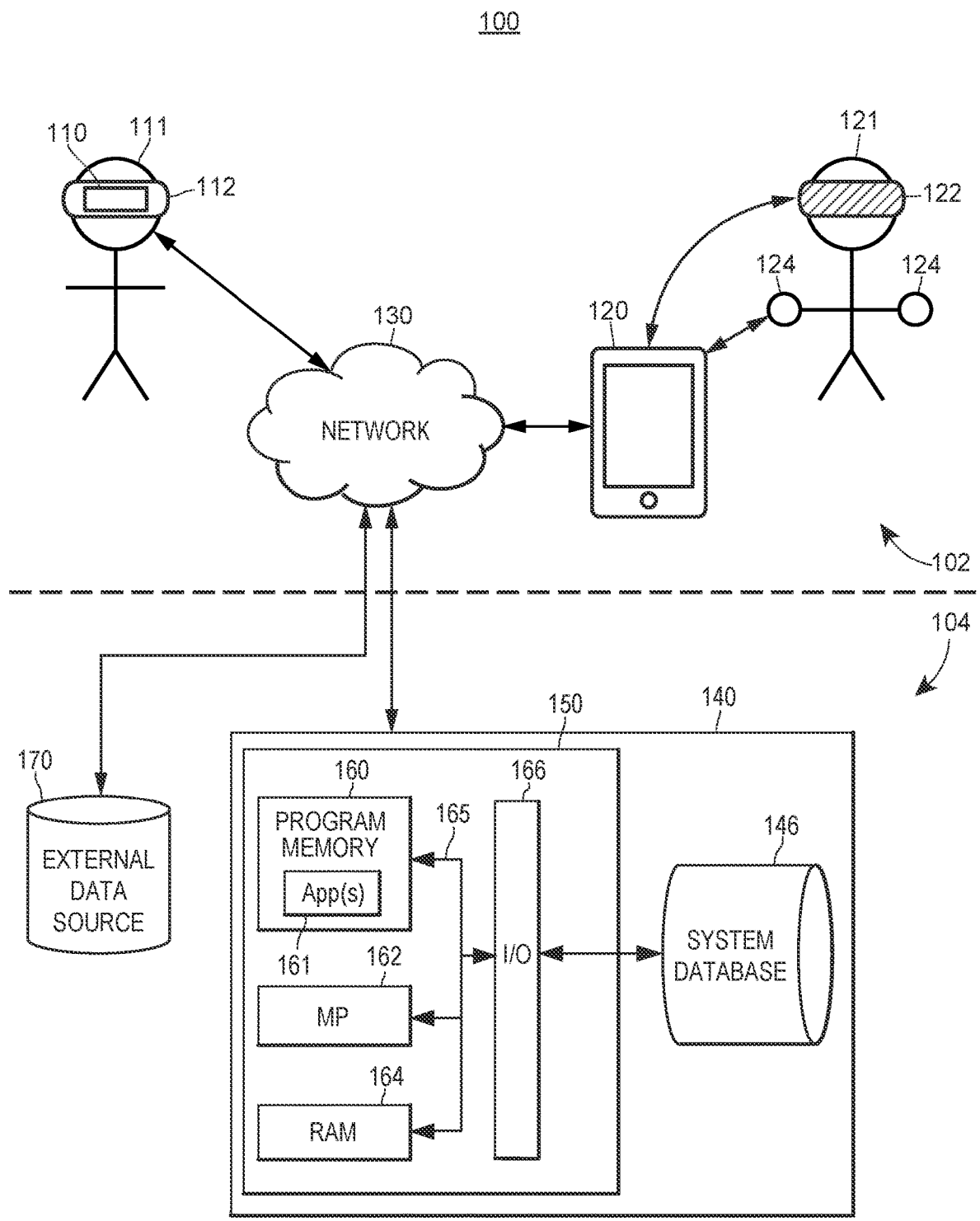
FIG. 1 illustrates a block diagram of an exemplary virtual environment system on which the methods described herein may operate, in accordance with embodiments described herein.

The systems and methods herein generally relate to improvements to virtual reality (VR) systems. Particularly, the systems and methods herein may generate and provide an adjustable virtual environment comprising a "virtual property," of which various features (e.g., structural components, fixtures, appliances, small loose items, etc.) may be generated algorithmically using procedural generation techniques. One or more users (e.g., property assessment trainees and/or trainers) may enter the virtual environment and navigate the virtual property to identify relevant aspects of the virtual property that relate to property risk. Such relevant aspects of the property may include, for example, the integrity and materials of structural components, the placement and functionality of utilities and appliances, spoilage of food/beverage items, and/or other aspects of the property. The use of procedural generation techniques to produce a virtual property provides for emergent scenarios, in which combinations of procedurally generated features may amount to complex aspects that may affect risk associated with the property.

The virtual environment may utilize a wide variety of virtual tools to receive user interaction data indicative of attempts to identify these relevant aspects of the virtual property. The VR system may, for example, receive data indicative of the user's active engagement with features of the virtual property (e.g., picking up items, "marking" features, etc.), or may otherwise track the user's activity in the virtual environment (e.g., via field of vision or visual focus tracking and analysis).

The techniques described herein improve existing VR systems by providing dynamic adjustability in a virtual environment, such that various virtual properties may be provided to a user, each virtual property comprising different combinations and arrangements of features that present a variety of property assessment training scenarios for the user.

Overview of Terms

For the sake of clarity of this detailed description, definitions of some relevant terms should first be set forth.

"Real property," "property," "one or more properties," and the like, as described herein, refer to a three-dimensional space including a physical area of land, a structure upon the physical area of land, and/or other immediately surrounding areas on the physical area of land. Without limitation, real property may be a commercial property, such as (1) a food service property such as restaurant, bakery, confectionary, coffee shop, delicatessen, refreshment stand, etc.), (2) a medical property (e.g., hospital, medical office), (3) a retail property (e.g., clothing store, salon, etc.), and/or (4) another commercial property (e.g., an office property). Although embodiments herein will generally focus on commercial properties (particularly, food service properties), real properties may additionally or alternatively be a residential property (e.g., house, apartment unit/complex, farm, etc.). A "virtual property," as described herein, refers to a virtual representation of a hypothetical real property, but not necessarily an existing real property. That is, in light of the generation of the virtual property via procedural generation techniques, a virtual property represents various features found in real properties but may not directly correspond to any "physical" property that physically exists on a site, but rather represents the environment of a hypothetical real property.

A real property (i.e., a "physical" property or a virtual property) includes "features" interior to and/or closely exterior to a structure within the property. "Feature," "object," "one or more features," "one or more objects," and the like, as described herein, may include various elements within the property. Without limitation, features may include, for example, (1) structural features, e.g., walls, ceilings, roofs, floors windows, hallways, countertops, furniture, fences, etc., (2) utility features, e.g., electrical wiring and outlets, gas lines, water lines, etc. (3) appliances and fixtures, e.g., dishwashers, ovens, stoves, refrigerators, freezers, fryers, blenders, sinks, toilets, showers, etc. (4) furniture, e.g., chairs, booths, tables, etc., (5) safety protective devices, e.g., automatic extinguishing systems (AES), smoke and/or carbon monoxide (CO) detectors ("smoke/CO detectors"), door alarms, etc., (6) edible items, e.g., cooked or uncooked meats, produce, desserts, alcoholic and non-alcoholic beverages, etc.), and/or (7) other small items, e.g., cash registers, computers, eating utensils, cookware, etc. As used herein, "feature" and related terms may refer to the physical elements of a physical property, and/or to virtual representations thereof in a virtual property.

Any feature of a property may be associated with one or more characteristics thereof. A characteristic of a feature may refer, for example, to (1) a construction material or structural integrity of a feature, (2) a spatial characteristic of the feature within the virtual property, e.g., size, coordinates (x, y, z), rotation (roll, pitch, yaw), etc., (3) color, texture, and/or other visible appearance or condition of an item (e.g., freshness or spoilage of a food item), and/or (4) seals, stickers, or other visual markers that may be indicative of certification or inspection of a feature (e.g., a seal indicative of inspection of a safety feature by a proper supervising authority).

Features of a property (i.e., physical or virtual property) can be considered "modular" in that a feature includes various "sub-features." For example, an oven in a kitchen may be considered as composing sub-features such as an oven compartment, an oven door, a cooktop, one or more burners, electrical wiring and/or gas lines, and/or other small accessories pertinent to use of the oven (e.g., oven mitt, spatula, pots, pans, etc.), which may be placed inside or outside of the oven itself. Inversely, any feature may be considered a sub-feature of a larger feature of a property. For example, the stovetop burner may be considered a sub-feature of the oven, just as the oven itself may be considered a sub-feature of a larger cooking configuration or room. In light of this description, it should be understood that "features" and "sub-features," as described herein, have substantially similar meaning, with the distinction between the two terms being used to understand the relative relationship and arrangement of features within a property. In some embodiments, as will be described herein, procedural generation techniques for generating a virtual property may include generating features and sub-features as a hierarchical arrangement (e.g., generating a feature via generating its sub-feature(s)) in order to produce a virtual property that resembles a hypothetical physical property.

In embodiments described herein, "procedural generation" refers to automatic generation of at least portions of a virtual property according to one or more computing algorithms and/or rule sets. One or more algorithms may, for example, accept one or more input parameters, such as one or more parameter values, one or more constraints, or a map seed, to generate a significantly larger quantity of data to generate a virtual property. Generating a virtual property, as described in this detailed description, may refer to generating one or more features of the virtual property, wherein generating a feature may include selecting (1) the presence of the feature, (2) one or more sub-features of the feature, and/or (3) one or more characteristics of the feature. In some embodiments, procedural generation techniques may operate within constraints of predefined rule sets, which may define, for example, where certain property features are permitted to appear, how certain property features are allowed to "intersect," and/or the degree to which the virtual environment should be populated with features to complete a virtual property. In some embodiments, procedural generation techniques may select features and/or rule sets from a preexisting library of features and/or rules stored at one or more computing devices.

Use of procedural generation thus stands in contrast to conventional techniques typically used in virtual environment generation by which each feature of the virtual environment is manually "hard-coded" by a human programmer or designer, without potential for variability across two or more virtual environments except through manual hard-coding of those two or more environments by the human. Procedural generation techniques will be described in more detail in subsequent sections of this detailed description.

In exemplary virtual environment use cases in which a user is a property assessment trainee, an objective of the user in the virtual environment generally includes identifying one or more relevant aspects of a virtual property, i.e., conditions of the virtual property that affect risk associated with the virtual property (e.g., increase or decrease risk associated with the virtual property). Typically, in the context of property assessment for generating an insurance policy, a physical property may be associated with risk in that, for example (1) one or more features have monetary value, thus presenting risk of loss, damage, replacement, etc., and/or may result in business downtime as a result thereof, (2) one or more features are associated with risk of injury to persons and/or damage to property, including liability therefor (e.g., as a result of a malfunction, improper installation, improper maintenance, improper use, natural event, etc.), and/or (3) one or more features may mitigate risk (e.g., in the case of fire suppression systems, burglar alarms, signage discouraging negligent or reckless activity, etc.). In the context of a virtual property, relevant aspects of the virtual property may be associated with risk in that the relevant aspects, if present in a physical property in the manner depicted in the virtual property, would affect risk associated with that physical property.

In accordance with the above, relevant aspects of a virtual property may include, for example, (1) the presence or absence of a particular feature within the virtual property, (2) the presence or absence of particular one or more sub-features within a feature present in the virtual property, (3) a particular characteristic of a feature (or sub-feature) present in the virtual property, and/or (4) a relative arrangement (e.g., relative placement) of two or more present features and/or sub-features, e.g., a relative arrangement of two or more procedurally generated features. Further specific examples of relevant aspects of virtual properties will be provided throughout this detailed description.

The virtual environment may implement various "virtual tools" via which (1) a user may interact with the virtual environment, and/or (2) one or more computing devices implementing the virtual environment may receive data indicative of user interaction with the environment ("user interaction data"). Without limitation, implemented virtual tools may include (1) "user tools" actively engaged by one or more users to manipulate the virtual environment (e.g., grab features, move features, mark features, insert comments, etc.), and/or (2) "tracking tools" employed by the one or more computing devices implementing the virtual environment to detect user interaction independently of active input by the user (e.g., a field of vision tracking tool, visual focus tracking tool, etc.). One or more computing devices may determine, based upon the user interaction data, whether the user navigating the virtual property in the virtual environment has identified one or more relevant aspects of the property.

Exemplary Computing Environment

FIG. 1 illustrates a block diagram of an exemplary virtual environment system 100 that may operate to implement (e.g., generate and provide to one or more users) a virtual environment including a procedurally generated virtual property. The high-level architecture includes both hardware and software applications, as well as various data communications channels for communicating data between the various hardware and software components. The virtual environment system 100 may be roughly divided into front-end components 102 and back-end components 104.

The front-end components 102 generally may allow one or more users to interact with a virtual environment via one or more virtual environment interface devices that may be physically accessible to the one or more users. Generally, such one or more virtual environment interface devices may include (1) one or more computing devices suitable for performing local processing, transmitting data over one or more networks, processing user input, and/or other computing actions described herein, and (2) one or more display/input devices suitable for visually and/or otherwise presenting a virtual environment, receiving user input, etc. Accordingly, as depicted by FIG. 1 and described herein, one or more virtual environment interfaces may include, for example, a mobile computing device 110 (e.g., a smartphone) and/or a dedicated virtual reality (VR) system 120. It should be appreciated, though, that other types and combinations of virtual environment interface devices may be used (e.g., various mobile or stationary computing devices, wearable computing devices, and/or other devices described herein).

In any case, the front-end components 102 may communicate with the back-end components 104 via a network 130 (i.e., one or more networks). Generally, the back-end components 104 may include one or more servers 140 that may communicate with the front-end components 102 and/or one or more external data sources 170. In some embodiments, as will be described in subsequent sections of this detailed description, the one or more servers 140 may be configured to provide a virtual environment simultaneously to two or more users via communications over the network 130. The network 130 may include a proprietary network, a secure public internet, a virtual private network or some other type of network, such as dedicated access lines, plain ordinary telephone lines, satellite links, cellular data networks, combinations of these, and/or other network(s). Where the network 130 comprises the Internet, data communications may take place over the network 130 via an Internet communication protocol.

Returning to the discussion of the front-end components 102, an example mobile computing device 110 may be associated with a mobile device user 111. The mobile computing device 110 may include a tablet computer, smartphone, wearable computer device (e.g., backpack, headset, or smart watch), and/or similar devices. The mobile computing device 110 may include one or more position sensors (e.g., accelerometers, gyroscopes, or inertial measurement units) and a display screen. The positions sensors may provide data regarding position and movement of the mobile computing device 110 to facilitate determination of position or viewing perspective within the virtual environment. The display screen may be used to present a visual representation of a view of the virtual environment. The mobile device user 111 may thereby interact with the mobile computing device 110 to access and navigate a virtual environment, in accordance with embodiments described herein. Use of the mobile computing device 110 by the mobile device user 111 may include mounting the mobile computing device 110 within a head mount 112 (and/or another equivalent mounting apparatus) for hands-free use and a more immersive user experience, in some embodiments.

The virtual reality system 120 may include a general-purpose computer and/or a special-purpose computer specifically designed for virtual reality applications. Accordingly, the virtual reality system 120 may include, for example, a stationary computer (e.g., desktop PC), mobile computing device, wearable device (e.g., backpack-mounted computer), and/or any suitable combinations thereof. The virtual reality system 120 may include or interface with one or more displays 122 to present a visual representation of a view of the virtual environment to the VR system user 121. Furthermore, the virtual reality system 120 may include or interface with one or more input devices 124 (e.g., wired/wireless handheld input devices) to receive user input (i.e., user interaction) from the VR system user 121. In some embodiments, a display 122 and input devices 124 may be connected to the virtual reality system 120 as peripheral components. Moreover, in some embodiments, the display 122 and/or the one or more input devices 124 may similarly interface with the example mobile computing device 110 and/or other virtual environment interface devices described herein.

Although only one mobile computing device 110 of one mobile device user 111 and one virtual reality system 120 of one VR system user 121 are illustrated, it will be understood that, in some embodiments, various combinations of virtual environment interface devices and users thereof are envisioned. For example, the front-end components 102 may include any suitable number of virtual environment interface devices, including any devices or combinations of devices described herein. Moreover, in some embodiments, a single virtual environment interface device may provide a virtual environment to two or more users.

Naturally, computing capabilities may significantly differ among various virtual environment interface devices utilized to access a virtual environment. For example, a special-purpose, dedicated virtual reality device may, in some circumstances, have superior processing and display capabilities when compared to some general-purpose laptop computers, desktop computers, and smartphones. Accordingly, in some embodiments, the server 140 may adaptively implement a virtual environment according to the computing capabilities of one or more front-end components to be used to access the virtual environment, in some embodiments. In some embodiments, for example, one or more virtual environment interface devices among the front-end components 102 may include a "thin-client" device, wherein computing actions by the thin-client device may be limited, for example, to just those necessary computing actions to visually display a virtual environment and/or receive user input, while back-end components 104 perform most or all remaining computing actions to generate a virtual environment, analyze user input, etc. Such techniques may be particularly effective, for example, in emerging 5G computing networks and other networks characterized by high data transmission rates.

Each virtual environment interface device may include any number of internal sensors and may be further communicatively connected to one or more external sensors by any known wired or wireless means (e.g., USB cables, Bluetooth communication, etc.). The mobile computing device 110 and virtual reality system 120 are further discussed below with respect to FIG. 2.

It should be noted that, in this detailed description, "user" or similar terms may be used as shorthand to refer to a front-end component 102 performing actions and/or accessing data in association with a human user. Thus, as an example, "providing a virtual environment to a user" may comprise providing a virtual environment to one or more front-end components 102 for use by a user. Similarly, "receiving data from a user," or similar terms, may refer to receiving data transmitted via one or more front-end components automatically or in response to input by a user at the one or more front-end components 102.

The back-end components 104 may include one or more servers 140 communicatively connected to the network 130. Each server 140 may include one or more processors 162 adapted and configured to execute various software applications and components of the virtual environment system 100, in addition to other software applications. The server 140 may further include a database 146, which may be adapted to store data related to the system 100, such as virtual environments, virtual properties, graphical assets used to generate virtual properties, rules used to generate virtual properties, user interaction data, image/video captures from virtual environments, and/or similar data, which the server 140 may access to perform actions described herein. The server 140 may include a controller 150 that is operatively connected to the database 146. It should be noted that, while not shown, additional databases may be linked to the controller 150 in a known manner. The controller 150 may include a program memory 160, a processor 162, a RAM 164, and an I/O circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits, which may process user input (e.g., via keyboard, mouse, voice, etc.) and/or provide user output (e.g., via a visual display, audio output device, etc.). The RAM 164 and program memories 160 may be implemented as semiconductor memories, magnetically readable memories, or optically readable memories, for example.

The server 140 may further include a number of software applications or routines 161 ("App(s)") stored in the program memory 160. In some embodiments, these applications or routines 161 may form modules when implemented by the processor 162, which modules may implement part or all of the methods described below to implement virtual environments among one or more users, record sessions within virtual environments, present recordings of virtual environment sessions, and/or process user interaction in virtual environments. In some embodiments, such modules may include one or more of a virtual property generation module, a communication channel module, a collaborative session management module, a virtual environment presentation module, a data recordation module, and/or a review module. In some embodiments, the modules may include one or more modules that enable a user to define, via one or more interactive graphical user interfaces, graphical assets to be used as features within virtual properties, and/or rule sets to be used in generation of features of virtual properties. User-defined graphical assets and/or rules may be stored via the system database 146, in some embodiments.

The back-end components 104 may further include one or more external data sources 170, communicatively connected to the network 130. The one or more external data sources 170 may, for example, include public or proprietary databases storing information that may be associated with physical real properties such as ownership records, zoning data, tax assessments, environmental reports, business listings, or insurance policies. In some embodiments, such information retrieved via the one or more external data sources may be used to generate rule sets for use in generating virtual properties, so as to generate virtual properties that realistically resemble hypothetical physical properties. Additionally or alternatively, in some embodiments, the one or more external data sources 170 may include graphical assets and/or rules that may be used to generate features of virtual properties.

Exemplary Virtual Environment Interface Device

Figure 2:
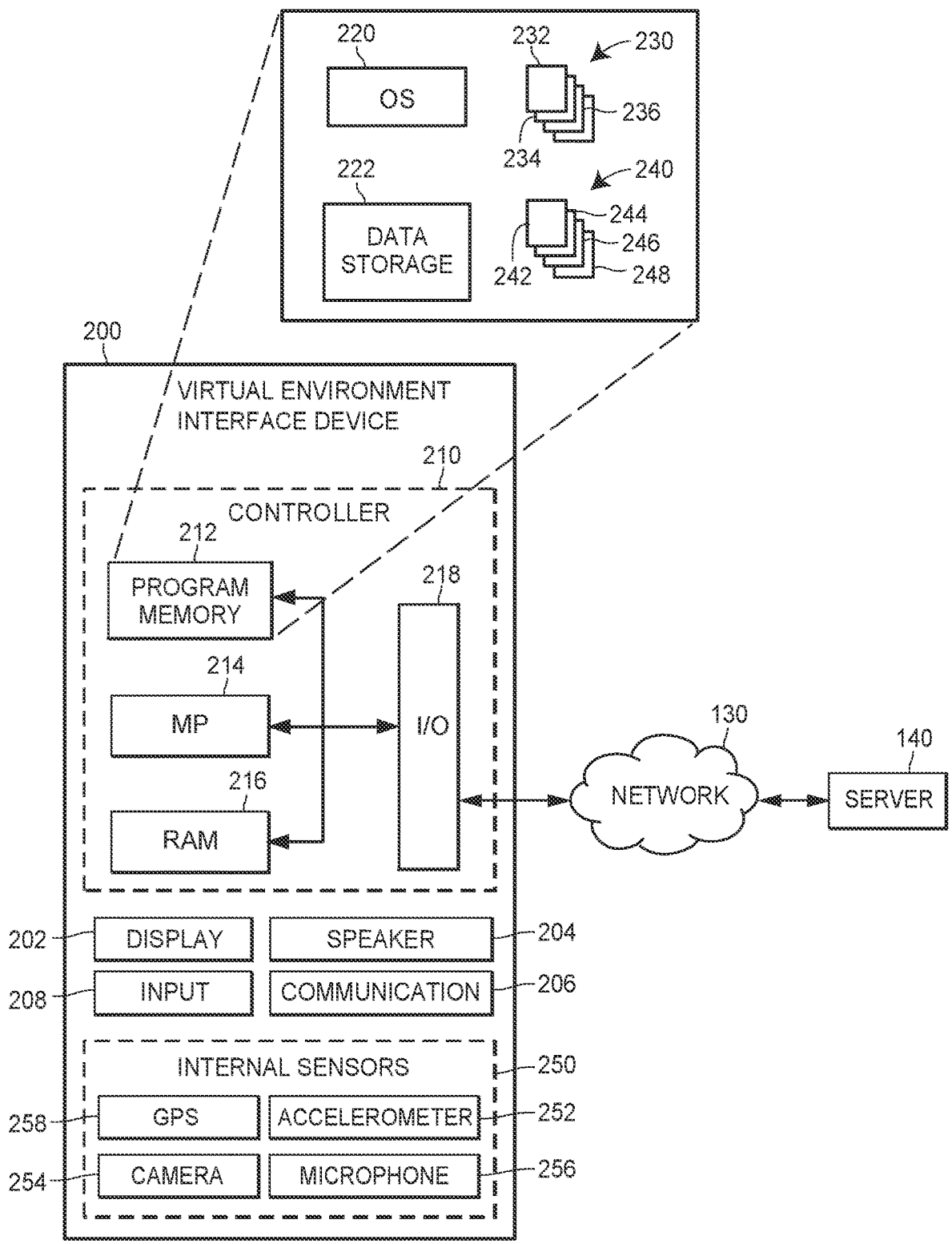
FIG. 2 illustrates a block diagram of an exemplary virtual environment interface device via which a user may access a virtual environment, in accordance with embodiments described herein.

FIG. 2 illustrates a block diagram of an exemplary virtual environment interface device 200 for user access to virtual environments. The virtual environment interface device 200 may include any suitable device or combination of devices described herein (e.g., the example mobile computing device 110, the example virtual reality system 120, etc.).

The virtual environment interface device 200 may include one or more internal sensors 250, which may provide sensor data regarding a local physical environment in which the virtual environment interface device 200 is operating. Such sensor data may include accelerometer data to position the virtual environment interface device 200 within its local physical environment, which may be used for navigating within the virtual environment. The sensor data may be processed by the controller 210 to facilitate user interaction with the virtual environment, as discussed elsewhere herein. Additionally, or alternatively, the sensor data may be sent to one or more processors 162 of the server 140 through the network 130 for processing.

The virtual environment interface device 200 includes a display 202, which is used to present a visual representation of the virtual environment to the user. The visual representation of the virtual environment includes a plurality of views at positions within the virtual environment, which are presented to the user as the user navigates around the virtual environment. The virtual environment interface device 200 also includes a speaker 204, which may be used to present sounds associated with the virtual environment or communications from other users during a virtual environment session. The virtual environment interface device 200 likewise includes an input 208 to receive user input from the user, which may include user interactions with the virtual environment, in some embodiments. Each of the display 202, speaker 204, or input 208 may be integrated into the virtual environment interface device 200 or may be communicatively connected thereto.

The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component. In some embodiments, communicatively connected speakers 204 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The internal sensors 250 may include any devices or components mentioned herein, along with other extant devices suitable for capturing data regarding a physical environment of a virtual environment interface device 200 or presenting communication data or data regarding a virtual environment (e.g., representations of components of structures within the virtual environment or representations of user annotations or markings within the virtual environment). In some embodiments, the sensors 250 may further include additional sensors configured or intended for other uses, such as geolocation, photography, or spatial orientation of the device. Although discussion of all possible sensors of the mobile computing device 110 would be impractical, if not impossible, several sensors warrant particular discussion. Disposed within the virtual environment interface device 200, the internal sensors 250 may include an accelerometer 252, a camera 254, a microphone 256, and a GPS unit 258. Any or all of these may be used to generate sensor data used in generating or interacting with virtual environments representing physical environments. Additionally, other types of currently available or later-developed sensors may be included in some embodiments. In some embodiments, additional external sensors may be communicatively connected to the mobile computing device, such as sensors of input devices 124 of a virtual reality system 120.

The accelerometer 252 may include one or more accelerometers positioned to determine the force and direction of movements of the virtual environment interface device 200. In some embodiments, the accelerometer 252 may include a separate X-axis accelerometer, Y-axis accelerometer, and Z-axis accelerometer to measure the force and direction of movement in each dimension, respectively. It will be appreciated by those of ordinary skill in the art that a three dimensional vector describing a movement of the virtual environment interface device 200 through three dimensional space can be established by combining the outputs of the X-axis, Y-axis, and Z-axis accelerometers using known methods.

Similarly, other components may provide additional positioning or movement sensor data. In some embodiments, a gyroscope may be used in addition to, or instead of, the accelerometer 252 to determine movement of the virtual environment interface device 200. For example, a MEMS gyroscope may be included within the virtual environment interface device 200 to detect movement of the virtual environment interface device 200 in three-dimensional physical space. Of course, it should be understood that other types of gyroscopes or other types of movement-detecting sensors may be used in various embodiments. Such sensor data may be used to determine a relative position of the virtual environment interface device 200 within its local physical environment. In some instances, such relative position information may be used to navigate an existing virtual environment by movements of the virtual environment interface device 200 within the local physical environment.

The camera 254 may be used to capture still or video images of the local physical environment of the virtual environment interface device 200 in the visual spectrum or other wavelengths, as well as objects or structures within the local physical environment. Such images may be used, for example, to receive user interaction data identifying one or more relevant aspects of a virtual property, or to facilitate substantially real-time interaction between two or more users of a virtual environment. The one or more cameras 254 may include digital cameras or other similar devices. Additional cameras 254 may also be communicatively connected to the virtual environment interface device 200, in some embodiments.

The microphone 256 may be used to detect sounds within the local physical environment, such as spoken notes or comments by the user of the virtual environment interface device 200, which spoken notes or comments may be used to detect a user's identification of relevant aspects of a virtual property, and/or to add marks, comments, etc. as visual overlays within a virtual property. In some embodiments, microphone 256 may likewise be used to capture spoken messages for communication between two or more users during a virtual session. One or more microphones 256 may be disposed within the virtual environment interface device 200 or may be communicatively connected thereto. For example, wired or wireless microphones 256 may be communicatively connected to the virtual environment interface device 200, such as wireless speaker/microphone combination devices communicatively paired with the virtual environment interface device 200.

The GPS unit 258 may provide information regarding the location or movement of the virtual environment interface device 200. The GPS unit 258 may use "Assisted GPS" (A-GPS), satellite GPS, or any other suitable global positioning protocol (e.g., the GLONASS system operated by the Russian government) or system that locates the position of the virtual environment interface device 200. For example, A-GPS utilizes terrestrial cell phone towers or Wi-Fi hotspots (e.g., wireless router points) to more accurately and more quickly determine location of the virtual environment interface device 200, while satellite GPS generally is more useful in more remote regions that lack cell towers or Wi-Fi hotspots.

The virtual environment interface device 200 may also communicate with the server 140, the one or more external data sources 170, and/or other components via the network 130. For example, the virtual environment interface device 200 may communicate with another virtual environment interface device (e.g., another front-end component 102 of FIG. 1) during a virtual session by communication through the server 140 via the network 130. Such communication may involve the communication unit 206, which may manage communication between the controller 210 and external devices (e.g., network components of the network 130, etc.). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, and/or other output from the controller 210 to the server 140 or other devices via the network 130.

The virtual environment interface device 200 further includes a controller 210. The controller 210 receives, processes, produces, transmits, and stores data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAMs 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memory 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the virtual environment interface device 200. Moreover, in some embodiments, such as thin-client implementations, additional processing and data storage may be provided by the server 140 via the network 130.

The software applications 230 and routines 240 may include computer-readable instructions that cause the processor 214 to implement various functions of virtual environment sessions, as described herein. Thus, the software applications 230 may include a virtual reality application 232 to present a virtual environment to a user, a communication application 234 to send and receive real-time communication with one or more other users via a communication channel, and a network communication application 236 to receive and transmit data via the network 130. The software routines 240 may support the software applications 230 and may include routines such as a relative position tracking routine 242 to process sensor data to maintain a relative position of the virtual environment interface device 200 within a physical environment, a virtual position tracking routine 244 for determining a corresponding virtual position within the virtual environment, a user annotation routine 246 to generate user annotations within the virtual environment based upon user input, and/or a virtual object measurement routine 248 to determine physical dimensions or measurements based upon virtual measurements within the virtual environment. It should be understood that additional or alternative applications 230 or routines 240 may be included in the program memory 212, including web browsers or other applications.

In some embodiments, the virtual environment interface device 200 may include a wearable computing device or may be communicatively connected to a wearable computing device. In such embodiments, part or all of the functions and capabilities of the virtual environment interface device 200 may be performed by or disposed within the wearable computing device. Additionally, or alternatively, the wearable computing device may supplement or complement the virtual environment interface device 200. For example, the virtual environment interface device 200 may be connected to a smart watch or head-mounted display.

Various embodiments of the virtual environment system 100 described above and illustrated in FIGS. 1-2 may be utilized to perform the methods discussed further below.
Procedural Generation Techniques "Procedural generation" generally refers to computing techniques via which data structures may be generated algorithmically, as opposed to manually. In implementations described herein, procedural generation techniques may generate at least portions of virtual properties algorithmically, such that two or more unique virtual properties may be generated and provided to users to provide a variety of training experience for prospective property assessment specialists. These techniques may be implemented, for example, via computing elements of the virtual environment system 100 of FIG. 1 (e.g., the server 140), and/or via other suitable computing elements.

In examples provided herein, procedural generation techniques will be described with regard to generating a virtual property representative of a restaurant ("virtual restaurant"), including the features therein and the characteristics thereof. It should be understood, though, that the techniques described herein may be implemented to generate other types of virtual properties, including any virtual properties described herein, and including various features and characteristics thereof. Various procedural generation techniques will be described herein, and may be utilized in combination, where appropriate, to generate at least a portion of the virtual property.

Procedural generation techniques may be used to generate any of the features of virtual properties described herein, i.e. at any level of granularity in a virtual property. For example, procedural generation techniques may generate high-level features of the virtual property, such as arrangements of structural features that make up a floor plan (e.g., walls, floors, ceilings, countertops, utility components, etc.). Procedural generation techniques may further be used generate lower-level features of the virtual property such as, in the case of the virtual restaurant, appliances, cupboards, point of sale system components (e.g., cash registers), safety devices, etc. Still further, procedural generation techniques may be used to generate even lower-level features of the virtual restaurant, such as sub-features of appliances, food and beverage items, small electrical components, cooking utensils, etc. Moreover, procedural generation techniques may be used to generate various visual and/or other characteristics of any of the property features described herein (e.g. paint color, ornamental decorations, etc.). Accordingly, via implementation of these techniques, two or more generated virtual properties may differ or coincide in features and characteristics at any level of detail. The level of detail at which procedurally generation techniques are used may be adjusted according to intended use of the virtual properties. For example, in implementations where it may be desired for a property assessment trainee to learn to identify spoiled food products or electrical hazards, procedural generation techniques may be applied to generate low-level features such as food items, electrical wiring and the like such that two or more generated virtual properties differ with respect to these features (but coincide with respect to a high-level floor plan, in some embodiments).

Features for use in virtual properties generated via procedural generation techniques may be sourced from one or more data sources, such as the system database 146 of the server 140, an external data source 170, and/or another data source that may store graphical assets (e.g., objects, textures, etc.) for use as features. To produce a large possibility space for procedurally generated virtual properties, a stored feature may be associated with (1) two or more versions of the feature (e.g., a walk-in refrigerator and a conventional refrigerator, (2) various sub-features of the feature (e.g., electrical components of the refrigerator, interior contents, etc.), (3) graphical assets corresponding to other characteristics of the feature (e.g., texture objects), and/or (4) larger features of which the stored feature may be a sub-feature. Generating a feature within a virtual property may include generating an instance of a version of the feature in light of the above. Thus, any two generated instances of a feature may have relatively unique, procedurally generated sets of sub-features or characteristics.

Methods for using procedural generation techniques to populate a virtual property may follow a "top-down" approach. That is, high-level features of a virtual property (e.g., walls, floors, major utility lines) may first be generated, and increasingly lower-level features may be generated subsequently therewith until the virtual property has been fully populated with features so as to realistically represent a hypothetical physical property. At any point in generation of a virtual property, various rules may govern the generation of features, including the relative arrangements thereof. By way of example, these rules may include:

- rules constraining geometrical intersection among two or more features (e.g., kitchen appliances should not intersect with each other, but smaller items such as kitchen utensils or food items might be generated "inside" of a compartment in an appliance);
- rules constraining the high-level arrangement of structural features of the virtual property (e.g., rules defining a minimum and/or maximum length, width, and/or height of a certain room, rules defining appropriate intersection angles of walls, floors, ceilings,
- rules constraining conditions upon which a particular feature may be present (e.g., based upon the presence of another one or more features, based upon a particular category of virtual property that is being generated);
- rules constraining at what location a particular feature may appear (e.g., a cash register may appear on top of a countertop but not on a countertop within a kitchen);
- rules defining the size and/or rotational placement of a feature (e.g., an appliance should be rotated such that its back faces a wall, and such that the appliance lays flat on a floor, countertop, or other surface); and/or
- rules setting forth a minimum and/or maximum number of instances of a feature in a virtual property (e.g., maximum of two refrigerators and one oven in a kitchen, maximum of six chairs around a table, etc.).

Governance of procedural generation according to one or more rules may ensure that a generated virtual property realistically resembles a hypothetical physical property. Moreover, a top-down application of these rules may include upward propagation of rules conflicts that may result from use of alternate techniques (e.g., resolution of a kitchen appliance rule conflict requiring a higher-level structural feature to be moved to accommodate the lower-level conflict resolution).

In some embodiments, procedural generation algorithms may randomly (or pseudo-randomly) generate features of a virtual property within the bounds of the predefined rule set. For example, a randomly generated "map seed" number may be used as an initial value from which a portion of or the entirety of the virtual property may be generated, with the generation of the virtual property limited within the bounds of the predefined rule set. In some embodiments, one or more parameter values may be automatically or manually defined, and procedural generation techniques may produce a portion of or the entirety of the virtual property based upon the initial parameter values.

A virtual property, once generated, may be associated with a number of relevant aspects thereof. In some embodiments, further rules may be used to automatically determine relevant aspects of the virtual property based upon, for example, (1) presence of generated features, (2) characteristics of generated features, (3) relative arrangements of generated features, and/or other considerations described herein. Additionally or alternatively, a trained user (e.g., expert property assessment specialist) may enter the generated virtual property to define one or more relevant aspects for identification by subsequent trainee users.

Example Virtual Property

Figure 3:
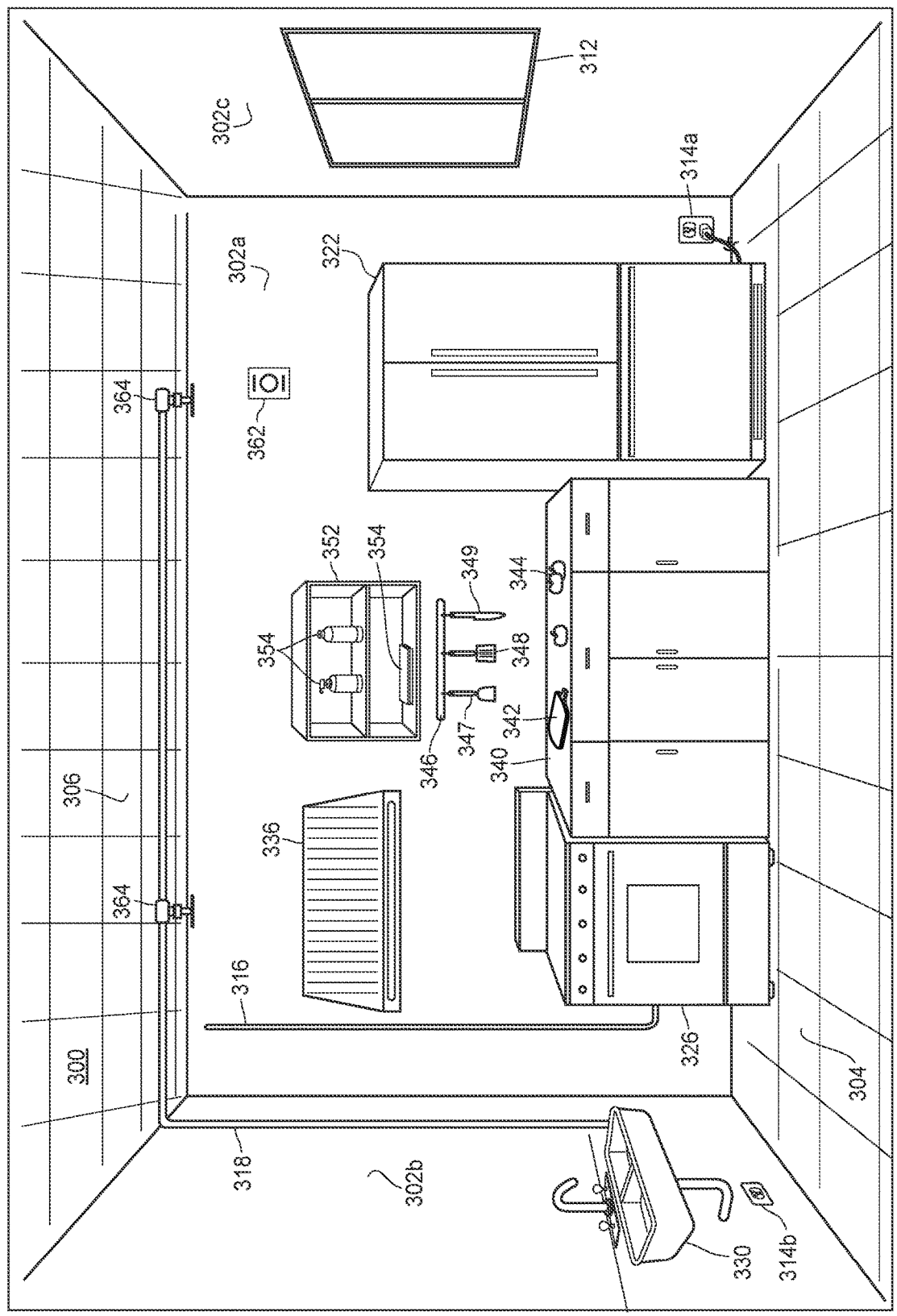
FIG. 3 illustrates an exemplary portion of a virtual property within the virtual environment, the exemplary virtual property being generated via techniques described herein and provided to a user via a virtual environment interface device.

FIG. 3 illustrates an example portion of a virtual property that may be procedurally generated and provided to one or more users via the procedural generation techniques described herein. More specifically, FIG. 3 illustrates a user's view of a virtual kitchen 300 that may be included in a generated virtual property (e.g., a virtual representation of a hypothetical fast food restaurant). The view of the virtual kitchen 300 in FIG. 3 corresponds to just one view of the three-dimensional virtual space of the virtual kitchen 300, in which the user may navigate to produce different views in accordance with the user's position within the virtual property. The virtual kitchen 300 may be generated and provided via computing elements of the virtual environment system 100 depicted in FIG. 1, and/or via other suitable computing elements. The virtual kitchen 300 may include additional, fewer, and/or alternate elements to those depicted in FIG. 3, including any virtual property features/characteristics described in this detailed description.

The virtual kitchen 300 includes a back wall 302a, a first side wall 302b, and a second side wall 302c. Connecting the walls 302a-302c are a floor 304 and a ceiling 306. As a result of proper application of the procedural generation techniques described herein, the walls 302a, floor 304, and ceiling 306 may intersect at respective edges at 90 degree angles and/or other appropriate angles, with the floor 304 being substantially level (e.g., substantially parallel to a ground surface and spanning across X-Y coordinates) and the ceiling 306 being connected to the floor 304 only via the walls 302a-302c. Situated upon the wall 302c and substantially parallel to the wall 302c is a four-panel window 312.

Various utility features may be placed near, upon, or inside the structural features described above. In the virtual kitchen 300, these utility features include electrical outlets 314a and 314b, a gas utility line 316, and a water utility line 318, which may serve to connect other features of the virtual kitchen 300 to respective utility sources. These connected features may include appliances and/or fixtures, in this case a refrigerator 322, a stovetop grill 326, a stovetop air vent 336. Between the refrigerator 322 and the stovetop grill 326 is a table 340. These appliances and fixtures are appropriately situated, for example facing outward from the wall 302c and not intersecting each other.

Various other features may be situated within, upon, and/or otherwise near to appliances and/or fixtures. For example, upon the table 340 are a cutting board 342 and a food item 344. Situated above the table may be a rack 346 holding a ladle 347, a spatula 348, and a cutting knife 349. Above the rack 346 may be a shelving unit 352 holding various cleaning products 354. In some embodiments, these features may be produced via a feature/sub-feature arrangement in which, for example, the cutting board 342 and food item 344 may be sub-features of the table 340.

Various safety devices that may be situated within the virtual kitchen 300 include smoke/CO detector 362 and two automatic sprinklers 364. In accordance with example procedural generation rules, the one or more automatic sprinklers 364 are connected in series or in parallel to the water utility line 318.

At least some characteristics of any of the above-described features may be randomly generated according to the procedural generation techniques described herein. For example, procedural generation techniques may be applied to randomly determine (1) material composition of the walls 302a-302c, floor 304, and/or ceiling 306, (2) structural integrity of structural features, utility features, appliances, and/or fixtures, (3) rotation and/or placement of small features (e.g., food items and cleaning products upon tables/shelves) and/or (4) other visual appearances of features (e.g., freshness of food items, color of fixtures, etc.).

The virtual kitchen 300 may be associated with a number of relevant aspects thereof. Relevant aspects of the virtual kitchen may include, for example, (1) an electrical threat posed by the position of a leaky pipe of the sink 330 above the electrical outlet 314b, (2) a fray in an electrical cord connecting the refrigerator 322 to the electrical outlet 314a, (3) full coverage of the virtual kitchen 300 via the sprinklers 364, (4) a sanitary condition of items near or upon the table 340, and/or various other relevant aspects described herein.

Task Designation and Preparation

In exemplary virtual environment use cases in which a user is a property assessment trainee, an objective of the user in the virtual environment generally includes identifying one or more relevant aspects of a virtual property. To facilitate identification of relevant aspects of the virtual property, one or more tasks may be provided to the user before entering the virtual property and/or while within the virtual property. These one or more tasks (task list) may correspond to tasks which a property assessment specialist is expected to perform at a physical property. Accordingly, each task may be associated with identification of zero, one, or more relevant features, where full completion of each task may result in identification of one or more relevant features when present. By way of example, tasks associated with a virtual property may include:

- examining the structure of the virtual property (e.g., walls, floors, ceilings, loose construction materials, etc.);
- examining the appliances of a kitchen;
- certifying safety devices in a virtual property (e.g., presence, placement, and functionality of safety devices such as fire suppression systems, etc.);
- identifying tripping hazards and/or other personal injury hazards (or lack thereof);
- determining monetary value of one or more features (e.g., combined value of features against which a property may be insured);
- examining foods, medical products, and/or other perishables for evidence of spoilage and/or mishandling; and/or
- determining the insurability of the virtual property as a whole (e.g., from a multiplicity of categories of commercial businesses that can be insured, based upon total square footage, occupancy, etc.).

In some embodiments, an expert property assessment specialist may manually define tasks associated with a particular virtual property. In some embodiments, at least some tasks may be constant across various virtual properties. In some embodiments, tasks associated with a virtual property may be determined automatically based upon the generated features of the virtual property. Furthermore, in some embodiments, only a partial list of tasks may be provided to the user, where one or more hidden tasks are further expected of the user in the virtual property.

In some embodiments, a dedicated portion of the virtual environment (e.g., separate from the virtual property) may be generated and provided for arranging a task list prior to the user entering a virtual property in the virtual environment. This dedicated portion of the virtual environment may represent a virtual office in which one or more users may arrange a task list for the virtual property, arrange relevant tools/materials for use in analyzing the virtual property, or perform other preparatory actions expected of a property assessment specialist.

Environment Interaction and Performance Evaluation

Various virtual tools may be implemented in the virtual environment, such that the user may identify relevant aspects of the virtual property and otherwise interact with the virtual property. Generally, use of these virtual tools may cause data (i.e., user interaction data) to be transmitted to the server 140, and the server 140 may, based upon the user interaction data received at the server 140, determine whether the user has identified one or more features of the virtual property. The server 140 may evaluate the user's performance in a particular virtual property based at least in part upon the user's identification of relevant aspects (e.g., in connection with completion of a task list).

Implemented virtual tools may include various user tools via which the user may actively annotate the virtual property. User tools may include, for example, drawing tools, highlighting tools, comment tools, voice tools, etc. In some embodiments, user tools may include a camera tool and/or a recording tool, via which the user may capture still images and/or video clips including a relevant aspect in the virtual property. Based upon a data capture command by the user, the server 140 may store an image and/or video recording of at least a portion of the virtual property, and may analyze the stored image and/or video to determine whether the user has identified a relevant aspect of the virtual property. In some embodiments, use of these tools may cause additional controls to be displayed within the virtual property, which may enable the user to identify relevant aspects of the virtual property and/or provide other data via a drop-down tool, radio button, and/or other virtual controls.

In some embodiments, user tools may enable the user to grab and collect small objects such as food items, utensils, etc., to simulate the user closely visually examining those features of the property. In some embodiments, tools such as these may be used in conjunction with other virtual tools such as the drawing tool, annotation tool, etc., so as to provide further user interaction with a collected object.

Figure 4:
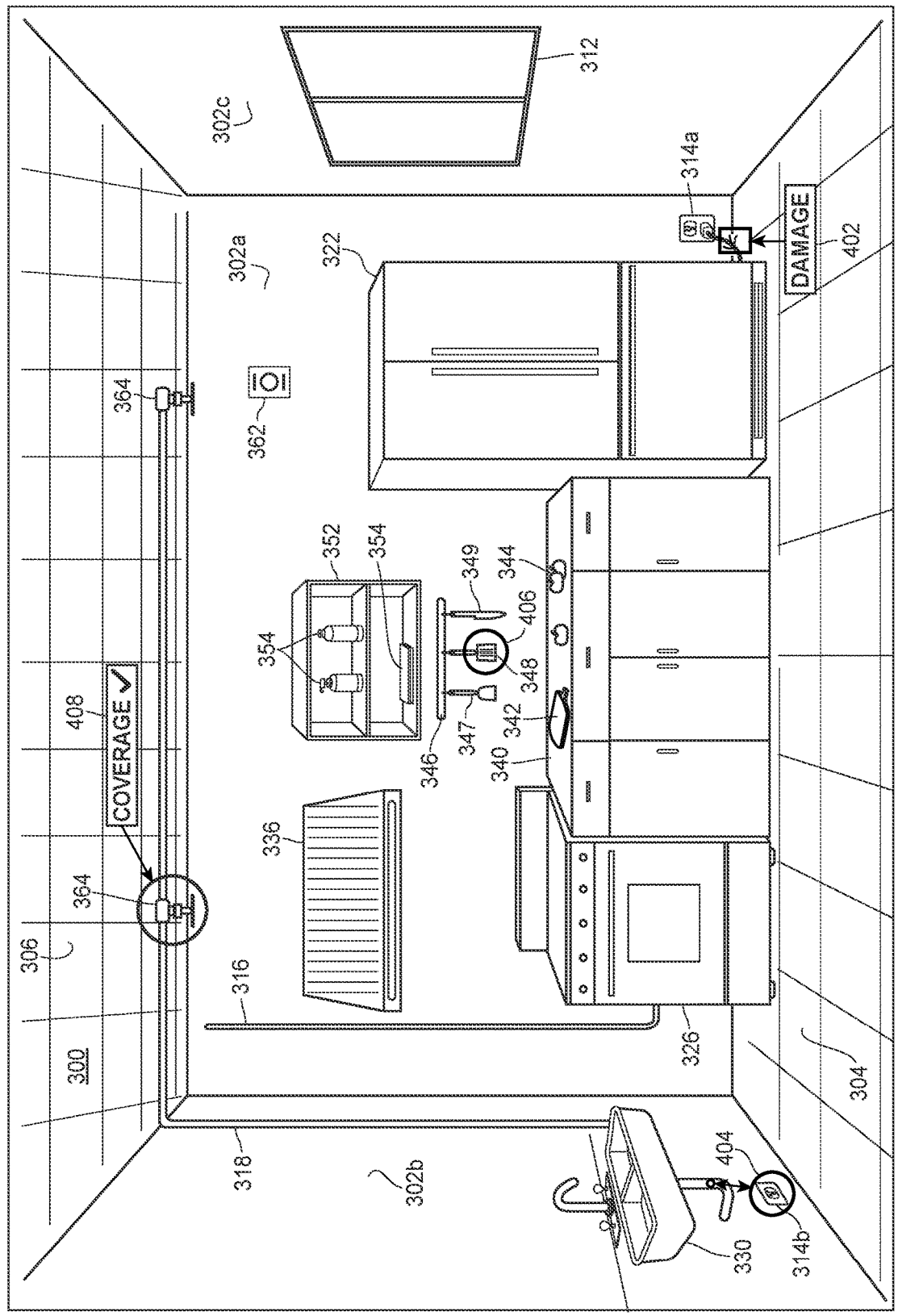
FIG. 4 illustrates the exemplary portion of the virtual property of FIG. 3, further including visual overlays presented in accordance with user interaction data received via the user.

Use of user tools may cause one or more visual overlays to be presented within the virtual property signifying the provided user interaction data. FIG. 4 depicts the example virtual kitchen 300 of FIG. 3, modified via visual overlays that may be displayed in response to received user interaction data, and which may indicate relevant aspects of the virtual property once identified by the user. Virtual overlays in the virtual kitchen 300 include, for example, an overlay 402 identifying damage to the electrical wire of the refrigerator 322. The virtual overlays further include an overlay 404 identifying a relative placement of a pipe of the sink 330 to the electrical outlet 314b (e.g., a leaking hazard). Another virtual overlay 406 indicates proper storage of the spatula 358 upon the rack 346. Still another virtual overlay 408 indicates that the automatic sprinklers 364 provide proper protective coverage of other features of the virtual kitchen 300.

Virtual tools in the virtual environment may additionally or alternatively include various tracking tools, via which the server 140 may receive user interaction data to track user interaction with a virtual property independently of user input. These tools may, for example, include a field of view tracking tool and/or a visual focus tracking tool. The server 140 may determine, based upon received user interaction data, to which feature(s) a user's attention is directed, for how long the user's attention is directed to the feature(s), for what percentage of a user's session the user is near the feature(s), etc., to determine whether the user has identified a relevant aspect in the virtual property.

Still additionally or alternatively, a user may provide user interaction data via tools exterior to the virtual environment. For example, during or subsequent to a session in the virtual environment, the user may provide written, oral, and/or electronic responses to indicate relevant aspects that the user has identified in the virtual property.

Generally, a user's performance in the virtual environment may be evaluated based upon the user's success or failure in identifying one or more relevant aspects of the virtual property. The user's performance may be based, for example, on (1) a total number of relevant aspects identified by the user and/or tasks completed in the virtual property, (2) a number of aspects falsely identified by the user as relevant, (3) a user's identification of features and/or completion of tasks within a time limit, and/or other suitable criteria. In some embodiments, a user's performance within a particular virtual property may be expressed as a composite score (e.g., 0 to 100). A composite score and/or other performance metrics may be used to compare performance between two or more users in a same virtual property, and/or to compare performance by one or more users in two or more virtual properties.

In some embodiments, the server 140 may store user performance data corresponding to one or more users, for subsequent use in providing virtual properties to one or more users. For example, if the server 140 determines that user performance data indicates that a particular user (or a group of two or more users) has struggled in particular categories of virtual properties (e.g., fast food shops), the server 140 may provide a next virtual environment comprising that particular category of virtual property to thereby improve user training in that category of virtual property. Similarly, if user performance data indicates that one or more users have struggled correctly assess certain features of a virtual property, the server 140 may subsequently provide one or more virtual environments more frequently having those certain features, and/or having more variability in those certain features (e.g., more variety in sub-features, characteristics of those features, etc.). Conversely, if user performance data indicates that one or more users have successfully assessed certain features of a virtual property, the server 140 may subsequently generate one or more virtual properties that keep those mastered features the same or similar as in a previous virtual property, so as to focus a virtual environment user's attention on improvement in assessing other features of the virtual property.

In some embodiments, the server 140 may implement one or more of the above-described modifications by applying one or more weighting factors to an algorithm for generating features of virtual properties based upon received user performance data. For example, in response to determining that users have struggled to identify faulty electrical components, the server 140 may apply a weighting factor to an algorithm to cause faulty electrical components to more frequently be generated as part of virtual properties in the procedural generation techniques described herein, and the server 140 may provide those generated virtual properties to the targeted users.

Shared Virtual Environments

In some embodiments, the server 140 may implement a shared virtual environment that enables two or more users to simultaneously navigate a virtual environment comprising a virtual property. The server 140 may send data to and/or receive data from two or more virtual environment interface devices 200 via the network 130. While a two-user virtual environment is described herein, it should be understood that via these techniques, any suitable number of users may share a virtual environment simultaneously.

In some embodiments, where two or more virtual environment interface devices 200 have differing computing capabilities (e.g., a comparatively high-capability special-purpose VR system and a comparatively low-capability, general-purpose smartphone), the server 140 may establish and maintain the shared virtual environment session by providing different data to the two or more different virtual environment interface devices 200 in accordance with their computing capabilities. For example, the server 140 may provide, to a high-capability virtual environment interface device 200, a high-fidelity virtual environment, and further provide, to the low-capability virtual environment interface device 200, a comparatively low-fidelity virtual environment that corresponds to the high-fidelity virtual environment in terms of basic structure and included features, but comprises less data than the high-fidelity virtual environment. The low-fidelity virtual environment may, for example, include a lower graphical resolution and/or lower frames-per-second to reduce data transmission and computing demand at the low-capability device.

In any case, to implement a shared virtual environment, the server 140 may establish one or more communication channels for substantially real-time bidirectional communication between two users. The one or more communication channels may include a text communication channel, a voice communication channel (e.g., voice-over-Internet-protocol (VOIP) channel), and/or another one or more suitable communication channels. The establishment of the one or more communication channels may enable two users to guide one another's movement and/or visual focus in the shared virtual environment.

In one example implementation of a shared virtual environment, the server 140 may generate and provide a virtual property to a first "expert trainer" user (e.g., via a first virtual environment interface device 200) and to a second "trainee" user (e.g., via a second virtual environment interface device 200). Through the establishment of the shared virtual environment between the trainer and trainee users, the trainer user may observe the trainee user's navigation throughout the virtual property to identify relevant aspects and/or complete tasks. In some embodiments, either or both users may be represented in the virtual environment via respective virtual avatars whose movement about the virtual environment may be controlled via input from the respective user.

In some embodiments, further virtual tools may be implemented in the shared virtual environment, via use of which the expert trainer user may improve the training experience of the trainee user. Such expert trainer tools may include, for example, a view control tool that enables the expert trainer user to control the movement and/or visual focus of the trainee user within the virtual environment. Furthermore, in a shared virtual environment, any use of suitable virtual tools by either user may be made visible to the other user in the shared environment. For example, if the expert trainer user uses the drawing tool to circle a particular area or feature of the virtual property, the circling via the drawing tool may be visible to the trainee user in a substantially real-time manner in the shared virtual environment. Thus, via use of communication channels and/or virtual tools in the shared virtual environment, two or more users may collaborate to direct each other's attention to particular features of a virtual property to identify relevant features thereof.

Feature Configuration Studio

Figure 5:
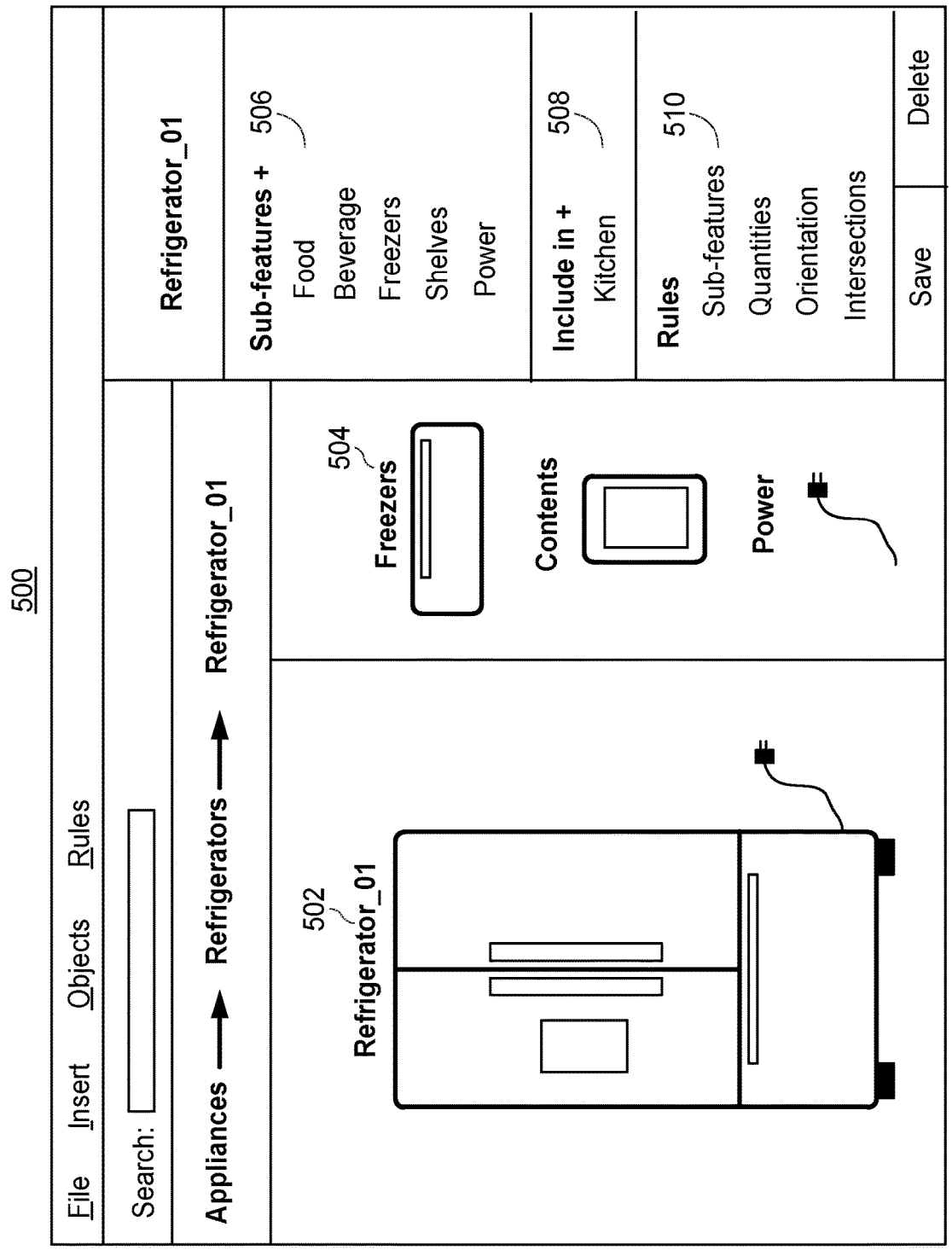
FIG. 5 illustrates an exemplary interactive graphical user interface (GUI) via which a user may define various features and/or rules for use in generating virtual properties.

In some embodiments, a computing device (e.g., server 140) may store one or more applications that enable a user to create, view, and/or modify digital structures to be used to procedurally generate virtual properties. FIG. 5 illustrates an example interactive graphical user interface (GUI) 500 that may enable the user to create, view, and/or modify features and rule sets for generating virtual properties. The user may access the GUI 500 via the server 140 and one or more suitable input devices (e.g., mouse, keyboard, voice input, etc.), and/or other similar computing devices.

The example GUI 500 may include a feature display panel 502 via which the user may view a feature or a particular version of a feature. In the panel 502, a feature "Refrigerator_01" corresponds to a particular version of an electric refrigerator having two doors, a smart display, a freezer compartment, and an electric power cord for connection to an electric power source. The feature "Refrigerator_01" may further include contents in the interior of the refrigerator (e.g., food and/or beverage items, cookware, etc.). A second panel 504 may enable the user to further configure sub-features such as the freezer compartment, contents of the refrigerator, and/or power components. Thus, use of the panels 502 and/or 504 may enable the user to determine how certain features of a refrigerator (e.g., food spoilage, electrical malfunctions) are permitted to appear in one or more procedurally generated virtual properties.

The example GUI 500 further includes a sub-feature panel 506 via which the user may define which sub-features are permitted to be included in the refrigerator, including the characteristics thereof. The user may define, for example, that a refrigerator may include any of various predefined features corresponding to food items, beverage items, freezer components, shelving components, and/or power components. The example GUI 500 further includes a panel 508 via which the user may define in which larger features the refrigerator is to be considered a sub-feature. For example, as shown in the panel 508, the refrigerator may be a sub-feature of a larger "kitchen" feature.

The example GUI 500 further includes a rules panel 510 via which the user may create, modify, and/or delete additional rules corresponding to the feature. The user may for example, create rules that define (1) relationships among sub-features in the refrigerator, (2) the quantity of refrigerators (e.g., minimum and maximum number) that may appear within a same virtual property, (3) a required spatial orientation of the refrigerator when placed in a virtual property (e.g., along a wall, facing outward from a wall, placed flat upon a floor, etc.), and/or (4) under what circumstances the refrigerator can intersect with other features (e.g., can intersect with food/beverage items located therewithin, but cannot intersect with another appliance).

Effectively, via the example GUI 500, the user may define a possibility space according to which procedural generation techniques may generate virtual properties. Generating a particular feature in a particular virtual property may include randomly selecting a particular version of the feature, sub-features thereof, characteristics thereof, etc.

Exemplary Computer-Implemented Methods

Figure 6:
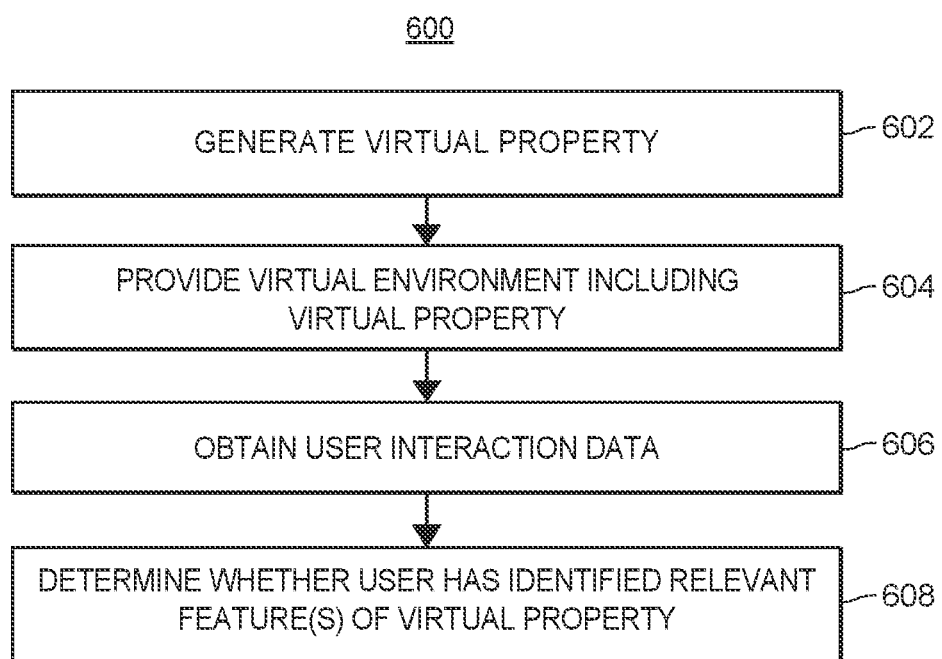
FIG. 6 illustrates a flow chart of an exemplary computer-implemented method for generating a virtual property and providing the virtual property in a virtual environment, in accordance with embodiments described herein.

FIG. 6 illustrates an exemplary computer-implemented method 600 for generating and providing a virtual environment comprising a procedurally generated virtual property. The method 600 may be implemented, for example, via computing elements of the virtual environment system 100 depicted in FIGS. 1-2 (e.g., via one or more processors executing non-transitory computer-executable instructions stored via one or more non-transitory computer-readable memories). In some embodiments, one or more computer-readable media may store non-transitory computer-executable instructions that, when executed via one or more processors, cause one or more computing devices to perform actions of the method 600. The method 600 may include additional, fewer, and/or alternate actions to those described herein, in some embodiments.

The method 600 includes generating a virtual environment comprising a virtual property (602), which may be representative of a hypothetical physical property such as a restaurant, medical office, etc. Generating the virtual property may include automatically generating (e.g., algorithmically generating) at least a portion of a plurality of property features in accordance with a predefined rule set. Generating the virtual property may include, for example, generating the virtual property based upon one or more predefined parameters and/or a random "map seed." Generating at least a portion of the plurality of features may include, for example (1) selecting one or more features to include in the virtual property (2) defining sub-features of those one or more features, and/or (3) defining one or more characteristics (e.g., placement, size, rotation, condition, etc.) of those features and/or sub-features. Generating the virtual property may comprise implementation of any of the procedural generation techniques described herein.

The virtual property, once generated, may be associated with one or more relevant aspects thereof. In some embodiments, generating the virtual property may include automatically identifying at least one of the one or more relevant aspects of the virtual property, based upon one or more predefined rules. In some embodiments, the one or more relevant aspects may be defined by a human user (e.g., property assessment specialist) having access to the virtual property and/or other data associated therewith. Relevant aspects of the virtual property may include, for example, a relative arrangement of two or more automatically generated features.

The method 600 includes providing, to a virtual environment interface device (e.g., one or more virtual environment interface devices 200), the virtual environment comprising the generated virtual property (604). One or more computing devices (e.g., the server 140 of FIG. 1) may provide a virtual environment session by transmitting data to and/or receiving data from one or more virtual environment interface devices (e.g., devices 200) corresponding to one or more respective users.

Providing the virtual environment may include implementing various virtual tools via which user interaction data may be obtained, the user interaction data being indicative of user interaction with the virtual environment (e.g., user actions within the generated virtual property). Accordingly, the method 600 may include obtaining user interaction data indicative of activity of the user in the virtual property (606). The obtained user interaction data may include, for example, (1) data indicative of user annotation (e.g., highlighting, circling, etc.) of features in the virtual property, and/or (2) tracking data corresponding to the user (e.g., field of view tracking or visual focus tracking).

The method 600 further includes determining, based upon the obtained user interaction data, whether the user has identified at least one of the one or more relevant aspects of the virtual property that affect risk associated with the virtual property. Determining whether the user has identified a relevant aspect may include (1) determining whether the user interaction data indicates that the user has attempted to identify a relevant aspect (e.g., has marked a feature, has focused on a feature beyond a predetermined threshold, etc.), and (2) determining whether the attempt indeed corresponds to a relevant feature. In some embodiments, the method 600 may further include providing a visual overlay within the virtual environment to indicate whether the user has correctly or incorrectly identified a relevant feature. In some embodiments, the method 600 may include scoring the user (e.g., 0 to 100) based upon overall performance within the provided virtual property.

The method 600 may further include generating a second virtual property, adjusting the virtual environment to include the second virtual property, and providing the second virtual property to the user. Like the first virtual property, the second virtual property may include a second plurality of features, at least a portion of which may be automatically generated based upon the predefined rule set. Via the procedural generation techniques herein, at least a portion of the features of the second generated virtual property may coincide with those of the first virtual property, and at least a portion of the features may differ. As with the first virtual property, user interaction data relating to user activity in the second virtual property may be obtained, and the method 600 may include determining whether the user has identified one or more relevant aspects of the second property.

In some embodiments, the method 600 may include comparing user interaction data from the first and second virtual properties (and/or other virtual properties) to identify trends relating to the user's performance in identifying relevant aspects across multiple virtual properties, such as types of tasks missed or incorrectly performed or types of features inspected. Based upon the user's performance in multiple virtual properties, strengths and weaknesses of the user may be identified, and subsequent virtual properties may be generated and/or provided to the user based upon the user's previous performance. Furthermore, in some embodiments, the method 600 may include determining user performance across multiple users of one or more virtual properties, and the method 600 may include generating and/or providing virtual properties (e.g., adjusting the virtual environment) based upon the performances of multiple users in the one or more virtual properties. To this end, one or more scores associated with user performance may be generated for user training and evaluation.

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed:

1. A computer-implemented method, comprising:
generating a virtual property, wherein the virtual property is simultaneously navigable, via a plurality of electronic devices, during a training exercise;
generating at least one feature of the virtual property associated with feature risk relevancy data;
providing, during the training exercise, a virtual environment to a first interface of a first electronic device of the plurality of electronic devices, the virtual environment comprising the virtual property including the at least one feature;
providing, during the training exercise, the virtual environment to a second interface of a second electronic device of the plurality of electronic devices;
receiving an input from the first electronic device, the input indicating a selection of the at least one feature in the virtual environment; and
modifying the virtual property based on the input such that a modification to the virtual property comprising a visual indicator of the at least one feature is simultaneously presented with an indication of the feature risk relevancy data, in the virtual environment and during the training exercise, via the first electronic device and the second electronic device.

2. The computer-implemented method of claim 1, wherein the first electronic device comprises a virtual reality hardware system and the second electronic device comprises a smartphone.

3. The computer-implemented method of claim 1, further comprising determining, in accordance with a predefined rule set, a plurality of features associated with the virtual property, each feature of the plurality of features being characterized by a corresponding risk associated with the virtual property.

4. The computer-implemented method of claim 3, further comprising:
   selecting, based on the input, a feature of the plurality of features; and
   providing an indication of the feature, and of a particular risk corresponding to the feature, to the second electronic device such that the feature and the particular risk are simultaneously presented, in the virtual environment and during the training exercise, via the first electronic device and the second electronic device.

5. The computer-implemented method of claim 3, further comprising:
   providing an indication of the plurality of features such that the plurality of features are simultaneously presented, in the virtual environment and during the training exercise, via the first electronic device and the second electronic device;
   receiving, and in response to presentation of the plurality of features, a second input from the second electronic device, the second input from the second electronic device indicating an association between a first feature of the plurality of features and a first risk; and
   determining, based on the second input from the second electronic device, a validity of the association between the first feature and the first risk.

6. The computer-implemented method of claim 5, further comprising:
   generating a visual overlay indicating the validity of the association; and
   providing the visual overlay to the second electronic device such that the visual overlay is presented, in the virtual environment and during the training exercise, via the second electronic device.

7. The computer-implemented method of claim 1, further comprising providing, within the virtual environment, one or more communication channels for real-time bidirectional communication between the first electronic device and the second electronic device.

8. The computer-implemented method of claim 1, further comprising providing, within the virtual environment, a virtual office separate from the virtual property, wherein the virtual office is configured to enable:
   generation of a task list associated with the virtual property, or
   arrangement of virtual tools and materials for use in analyzing the virtual property.

9. A system, comprising:
   one or more processors; and
   non-transitory computer memory storing instructions that, when executed via the one or more processors, cause the one or more processors to:
   generate a virtual property, wherein the virtual property is simultaneously navigable, via a plurality of electronic devices, during a training exercise;
   generate at least one feature of the virtual property associated with feature risk relevancy data;
   provide, during the training exercise, a virtual environment to a virtual environment interface of a first electronic device, the virtual environment comprising the virtual property including the at least one feature;
   receive an input from the first electronic device, the input indicating a selection of the at least one feature in the virtual environment; and
   modify the virtual property based on the input for presentation on a second electronic device, wherein a modification to the virtual property comprises a visual indicator of the at least one feature simultaneously presented with an indication of the feature risk relevancy data.

10. The system of claim 9, wherein the instructions, when executed via the one or more processors, further cause the one or more processors to determine, in accordance with a predefined rule set, a plurality of features associated with the virtual property, each feature of the plurality of features being characterized by a corresponding risk associated with the virtual property.

11. The system of claim 10, wherein the instructions, when executed via the one or more processors, further cause the one or more processors to:
   select, based on the input, a feature of the plurality of features; and
   provide an indication of the feature, and of a particular risk corresponding to the feature, to the second electronic device such that the feature and the particular risk are simultaneously presented, in the virtual environment and during the training exercise, via the first electronic device and the second electronic device.

12. The system of claim 10, wherein the instructions, when executed via the one or more processors, further cause the one or more processors to:
   provide an indication of the plurality of features such that the plurality of features are simultaneously presented, in the virtual environment and during the training exercise, via the first electronic device and the second electronic device;
   receive, in response to presentation of the plurality of features, a second input from the second electronic device, the second input from the second electronic device indicating an association between a first feature of the plurality of features and a first risk; and
   determine, based on the second input from the second electronic device, a validity of the association between the first feature and the first risk.

13. The system of claim 12, wherein the instructions, when executed via the one or more processors, further cause the one or more processors to:
   generate a visual overlay indicating the validity of the association; and
   provide the visual overlay to the second electronic device such that the visual overlay is presented, in the virtual environment and during the training exercise, via the second electronic device.

14. The system of claim 9, wherein the virtual environment includes a virtual avatar controlled by a first user via the second electronic device, and the instructions, when executed via the one or more processors, further cause the one or more processors to enable a second user to at least temporarily control, via the first electronic device, movement of the virtual avatar within the virtual environment.

15. The system of claim 9, wherein the instructions, when executed via the one or more processors, further cause the one or more processors to enable at least one user to at least temporarily control, via the first electronic device, presentation of the virtual environment via the second electronic device.

16. One or more non-transitory computer-readable media storing instructions that, when executed via one or more processors, cause the one or more processors to:
   generate a virtual property during a training exercise;
   generate at least one feature of the virtual property associated with feature risk relevancy data based on a capability of a first electronic device;
   simultaneously provide, over a network, the virtual property to the first electronic device and a second electronic device, the virtual property including the at least one feature;
   receive an input from the first electronic device, the input indicating a selection of the at least one feature; and
   modify the virtual property based on the input for presentation on the second electronic device, wherein a modification to the virtual property comprises a visual indicator of the at least one feature simultaneously presented with an indication of the feature risk relevancy data.

17. The one or more non-transitory computer-readable media of claim 16, wherein the first electronic device comprises a virtual reality hardware system and the second electronic device comprises a smartphone.

18. The one or more non-transitory computer-readable media of claim 16, the instructions further causing the one or more processors to determine, in accordance with a predefined rule set, a plurality of features associated with the virtual property, each feature of the plurality of features being characterized by a corresponding risk associated with the virtual property.

19. The one or more non-transitory computer-readable media of claim 18, wherein the virtual property, including the modification, is simultaneously presented in a shared virtual environment via the first electronic device and the second electronic device, during the training exercise.

20. The one or more non-transitory computer-readable media of claim 16, wherein the capability comprises at least one of a video display capability or an audio capability of the first electronic device.

* * * * *